US009081098B2

(12) United States Patent  
Misonoo et al.

(10) Patent No.: US 9,081,098 B2  
(45) Date of Patent: Jul. 14, 2015

(54) DETECTION DEVICE, DETECTING METHOD AND DETECTION PROGRAM

(75) Inventors: Satoshi Misonoo, Nishinomiya (JP); Yasunobu Asada, Nishinomiya (JP)

(73) Assignee: FURUNO ELECTRIC COMPANY LIMITED, Hyogo (JP)

( * ) Notice: Subject to any disclaimer, the term of this patent is extended or adjusted under 35 U.S.C. 154(b) by 655 days.

(21) Appl. No.: 13/310,370

(22) Filed: Dec. 2, 2011

(65) Prior Publication Data

US 2012/0139773 A1 Jun. 7, 2012

(30) Foreign Application Priority Data

Dec. 3, 2010 (JP) ................................ 2010-270498

(51) Int. Cl.
*G01S 13/89* (2006.01)
*G01S 13/00* (2006.01)
*G01S 15/96* (2006.01)
*G01S 7/52* (2006.01)
*G01S 7/524* (2006.01)
*G01S 15/10* (2006.01)

(52) U.S. Cl.
CPC ............ *G01S 15/96* (2013.01); *G01S 7/52004* (2013.01); *G01S 7/524* (2013.01); *G01S 15/104* (2013.01)

(58) Field of Classification Search
CPC ......... G01S 7/527; G01S 15/14; G01S 15/96; G01S 7/529; G01S 7/536; G01S 13/28
USPC .................... 367/97; 340/961, 963, 968, 970; 342/26, 65, 118, 134, 145, 202; 370/201, 337, 350, 493; 385/123; 701/4, 8, 9, 14, 120, 301
See application file for complete search history.

(56) References Cited

U.S. PATENT DOCUMENTS

| | | | | |
|---|---|---|---|---|
| 4,837,556 A * | 6/1989 | Matsushita et al. | .......... | 369/47.1 |
| 4,924,869 A | 5/1990 | Takeuchi et al. | | |
| 5,701,581 A * | 12/1997 | Eto et al. | .................... | 348/14.13 |
| 6,556,559 B1 * | 4/2003 | Mitsume et al. | .............. | 370/350 |
| 6,577,269 B2 * | 6/2003 | Woodington et al. | .......... | 342/196 |
| 6,864,831 B2 * | 3/2005 | Woodington et al. | ........... | 342/70 |
| 7,453,390 B2 * | 11/2008 | Nishiguchi et al. | ............. | 342/28 |
| 7,454,108 B2 * | 11/2008 | Ohtani et al. | ................. | 385/123 |
| 2004/0003958 A1 * | 1/2004 | Fujimoto et al. | .............. | 181/124 |
| 2009/0122642 A1 * | 5/2009 | Komatsu et al. | ................ | 367/21 |
| 2009/0296789 A1 * | 12/2009 | Watanabe et al. | ............. | 375/219 |

FOREIGN PATENT DOCUMENTS

| | | | |
|---|---|---|---|
| JP | 05-180928 A | 7/1993 |
| JP | 9-068571 A | 3/1997 |
| JP | 2001-159679 A | 6/2001 |
| JP | 2008-275351 A | 11/2008 |
| JP | 2009-276118 A | 11/2009 |
| JP | 2010-270498 A | 12/2010 |

OTHER PUBLICATIONS

Office Action of the corresponding JapanesePatent Application No. 2010-270498, dated Nov. 18, 2014.

* cited by examiner

*Primary Examiner* — Isam Alsomiri
*Assistant Examiner* — Amienatta M Ndure Jobe
(74) *Attorney, Agent, or Firm* — Global IP Counselors, LLP

(57) ABSTRACT

This disclosure provides a device, which includes a transceiver for outputting a reception signal according to an echo intensity of a transmission signal, a reception signal monitoring module for monitoring an intensity of the reception signal based on a saturation condition, and a transmitting condition setting module for controlling a transmitting power according to the intensity of the reception signal monitored by the reception signal monitoring module.

11 Claims, 6 Drawing Sheets

DETECTION DEVICE, DETECTING METHOD AND DETECTION PROGRAM

CROSS-REFERENCE TO RELATED APPLICATION(S)

The application claims priority under 35 U.S.C. §119 to Japanese Patent Application No. 2010-270498, which was filed on Dec. 3, 2010, the entire disclosure of which is hereby incorporated by reference.

TECHNICAL FIELD

This invention relates to a detection device, such as a radar and a fish finder, and a method and a program using the features of the device.

BACKGROUND OF THE INVENTION

Conventionally, a detection device, such as a radar, as shown in JP09-068571A, performs a pulse compression in order to improve resolution and a signal to noise (S/N) ratio.

In such a pulse compression, in order to suppress range side lobes, an envelope is weighted by applying a window function to transmission signals. However, when a reception signal is saturated, information on the envelope becomes no longer normal, and an appropriate pulse compression may be unable to be performed. In order not to saturate the reception signal, a technique of widening a receiving dynamic range can be used, for example.

A drawback of this technique is that an improvement of hardware performance is needed to widen the receiving dynamic range. Therefore, there creates a new problem that cost and a circuit scale increase.

SUMMARY OF THE INVENTION

Therefore, this invention is made in view of the above situations, and provides a detection method, device and computer program, which prevents a saturation of a reception signal, without increasing cost and a circuit scale.

According to one aspect of the invention, a detection device is provided. The device includes a transceiver, a reception signal monitoring module, and a transmitting condition setting module. The transceiver outputs a reception signal according to an echo intensity of a transmission signal. The reception signal monitoring module monitors an intensity of the reception signal based on a saturation condition. The transmitting condition setting module controls a transmitting power according to the intensity of the reception signal monitored by the reception signal monitoring module.

That is, when the reception signal reaches the saturation condition or becomes close to the saturation condition, the transmitting condition setting module performs setting to reduce the transmitting power, thereby preventing the saturation of the reception signal.

However, when the transmitting power is reduced, since the intensity of the reception signal is also reduced, the echo intensity appears to be reduced in a display screen. Therefore, it is desirable to perform the display correction (level increasing) of the echo data according to the transmitting power set by the transmitting condition setting module.

Moreover, if performing the pulse compression of the reception signal, it is desirable to set the pulse width according to the transmitting power set by the transmitting condition setting module. For example, if the pulse width is set longer corresponding to the reduced amount of the transmitting power, a reduction of an S/N ratio can be suppressed. Moreover, if the transmitting power set by the transmitting condition setting module satisfies a predetermined condition (for example, when the transmitting power becomes greater than a predetermined level), the pulse compression may be stopped. In this case, if the transmitting power set by the transmitting condition setting module satisfies the predetermined condition, the transmission pulse width setting module sets the pulse width of the transmission signal as the same pulse width as the pulse width of the reception signal after the pulse compression in case the pulse compression module performs the pulse compression.

The reception signal monitoring module may mainly monitor the intensity of the reception signal according to a water bottom depth. Since a water bottom echo is greater in a reflection intensity, compared with a school of fish, and it is often saturated especially when the depth is shallow, the reception signal monitoring module may monitor the saturating state of the reception signal near the water bottom depth.

When an intensity lower than the saturation condition by a predetermined difference is detected, the transmitting power may be increased. For example, the reception signal reaches the saturation condition and the transmitting power is reduced, and, after that, when the water bottom depth changes or a bottom sediment changes so that the intensity of the water bottom echo becomes very low, the transmitting power is increased to improve the S/N ratio.

Note that, also in this case, when the transmitting power is increased, the intensity of the reception signal is also increased, and the echo intensity appears in a display screen to be increased. Therefore, the display correction (level reduction) of the echo data may be performed according to the transmitting power set by the transmitting condition setting module.

According to another aspect of the invention, a detection method is provided. The method includes outputting a reception signal according to an echo intensity of a transmission signal, monitoring an intensity of the reception signal based on a saturation condition, and controlling a transmitting power according to the intensity of the monitored reception signal.

According to still another aspect of the invention, a computer readable detection program is provided. The program includes causing a computer to output a reception signal according to an echo intensity of a transmission signal, causing a computer to monitor an intensity of the reception signal based on a saturation condition, and causing a computer to control a transmitting power according to the intensity of the monitored reception signal.

As described above, according to the aspects of the invention, the reception signal will not be saturated, without increasing cost and a circuit scale.

BRIEF DESCRIPTION OF THE DRAWINGS

The present disclosure is illustrated by way of example and not by way of limitation in the figures of the accompanying drawings, in which the like reference numerals indicate like elements and in which.

DETAILED DESCRIPTION

Figure 1:
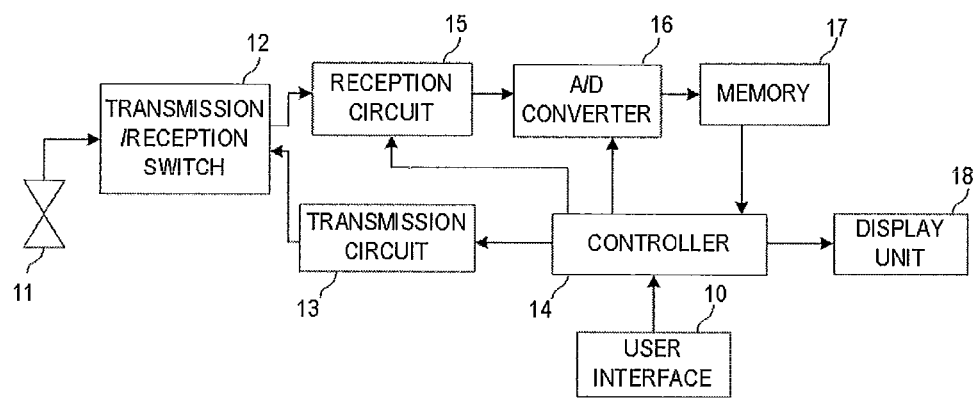
FIG. 1 is a block diagram showing a configuration of a fish finder.

FIG. 1 is a block diagram showing a configuration of a fish finder according to one embodiment of a detection device of the present invention. In this embodiment, the fish finder includes a user interface 10, a transducer 11, a transmission/reception switch 12, a transmission circuit 13, a controller 14, a reception circuit 15, an A/D converter 16, a memory 17, and a display unit 18.

The controller 14 controls a fish finder exhaustively, and sets a transmitting cycle and a detection range of the transmission circuit 13 in response to an instruction input from the user interface 10. The controller 14 sets a cycle of corresponding sampling pulses to the A/D converter 16, writes it into the memory 17, generates a read-out clock and an address, and outputs reception data (echo data) which is used for indication on the display unit 18. The display unit 18 displays the echo data where a vertical axis of a screen is used as a depth direction and a horizontal axis as a time direction.

The transmission circuit 13 inputs a pulse-shaped signal into the transducer 11 which serves as a transceiver through the transmission/reception switch 12 having a built-in trap circuit. The transducer 11 is an oscillator, which is typically attached to the bottom of a ship, and outputs an ultrasonic wave (transmission signal) underwater according to the pulse-shaped signal inputted from the transmission circuit 13. Here, the transmission signal is a frequency-modulated signal (for example, a signal of which amplitude is weighted by a cosine component to suppress the influence of a Doppler shift. Note that, in the present invention, neither the frequency modulation nor the amplitude weighting is essential.

The transmission signal outputted from the transducer 11 reflects on a target object, such as a school of fish or a water bottom, and is received as the echo. The transducer 11 outputs a reception signal according to the intensity of the received echo to the reception circuit 15 through the transmission/reception switch 12. The reception circuit 15 amplifies the inputted reception signal, and outputs it to the A/D converter 16. The A/D converter 16 converts the reception signal into a digital signal at a predetermined sampling rate, and sequentially records it in the memory 17. The memory 17 records all the reception signals for one measurement (1 ping), and the controller 14 performs the following process every time when the reception signal for 1 ping is recorded on the memory 17.

Figure 2:
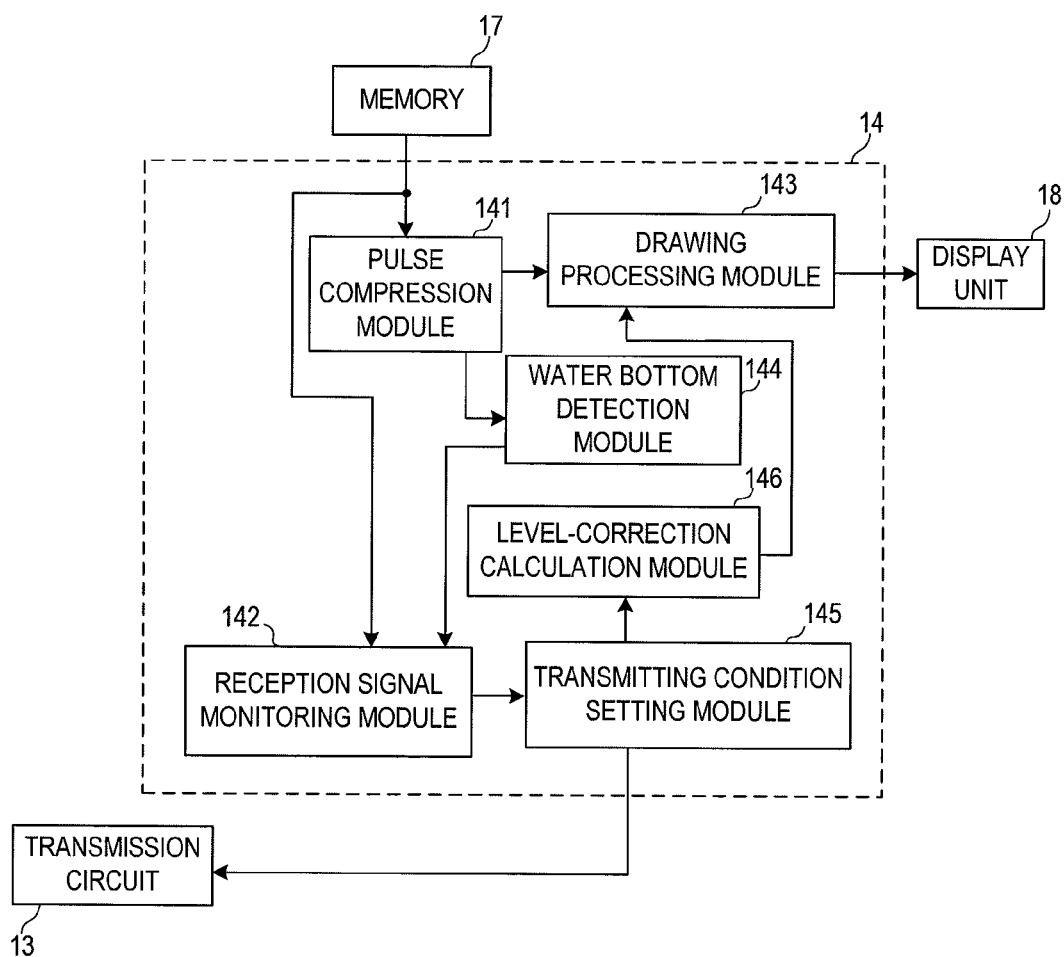
FIG. 2 is a block diagram showing a configuration of a controller.

FIG. 2 is a block diagram showing a primary configuration of the controller 14. The controller 14 includes a pulse compression module 141, a reception signal monitoring module 142, a drawing processing module 143, a water bottom detection module 144, a transmitting condition setting module 145, and a level-correction calculation module 146.

The pulse compression module 141 calculates a correlation between the reception signal read from the memory 17 and a predetermined reference signal (for example, the transmission signal), and carries out a pulse compression of the reception signal. The reception signal after the pulse compression is inputted into the drawing processing module 143 and the water bottom detection module 144. The drawing processing module 143 displays the inputted reception signal on the display unit 18 as the echo data corresponding to the depth, according to a lapsed time after the output of the transmission signal.

The water bottom detection module 144 analyzes the inputted reception signal to detect the water bottom depth, and the detected water bottom depth is inputted into the reception signal monitoring module 142. The detection technique of the water bottom depth may be selected from various techniques, which includes a technique based on the timing at which an echo greater than a predetermined level is received, a technique based on the timing at which a derivative value becomes the highest, a technique based on the timing at which a correlation value becomes the highest when the correlation is calculated between the reception signal and a representative waveform of the water bottom echo as a reference signal. Note that the water bottom detection module 144 may determine a sediment type of the water bottom. The determination technique of the bottom sediment may be based on a degree of matching between the reception signal and the reference signal (similarity), for example.

Figure 4A:
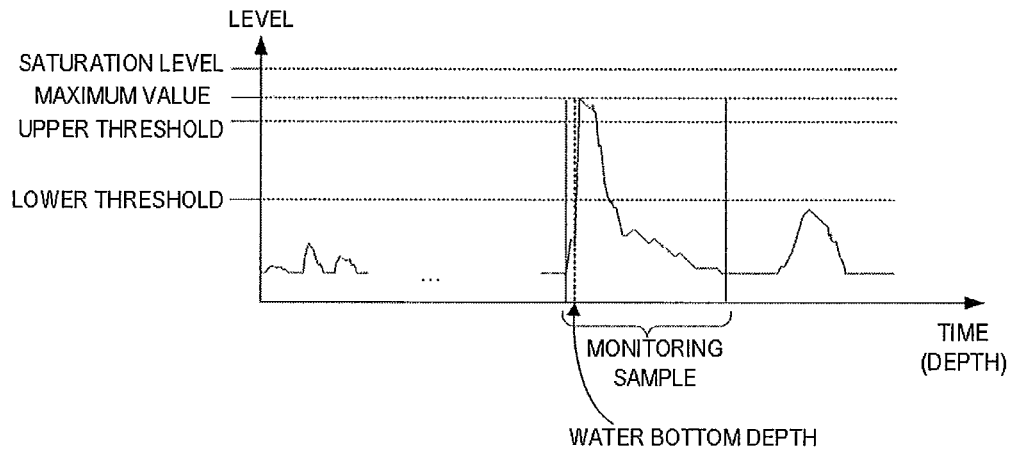
FIGS. 4A and 4B are graphs showing time-axis waveforms of reception signals.

The reception signal monitoring module 142 reads out the reception signal according to the water bottom depth from the memory 17 (a signal before the pulse compression), and monitors a saturating state. For example, as shown in FIG. 4A, the reception signal monitoring module 142 reads out a predetermined sampling number of the reception signals sequentially from the reception signals corresponding to shallower depths than the water bottom depth by a few numbers of samples, and uses them as monitoring samples. Then, the reception signal monitoring module 142 determines to be in the saturating state if the maximum value of the samples reaches a saturation level or it approaches close to the saturation level (when it becomes greater than an upper threshold shown in FIG. 4A). Alternatively, the reception signal monitoring module 142 may determine to be in the saturating state when the maximum values are detected at the same level continuously for a few number of samples. If the bottom sediment is determined, the reception signal monitoring module 142 may determine not to be in the saturating state when the bottom sediment is sand or mud which is low in a reflection intensity, and may determine to be in the saturating state when the bottom sediment is rocks, which is high in the reflection intensity.

Note that the reception signal monitoring module 142 may read out and monitor all the reception signals within 1 ping. However, since the water bottom is large in the reflection intensity compared with a school of fish, and the reception signal is often saturated especially when the depth is shallow, it is desirable to monitor the saturating state of the reception signal near the water bottom depth.

Moreover, if the detection range is large and the water bottom depth is deep, or if the water bottom is not detected within the detection range, a possibility that the reception signal is saturated becomes low. For this reason, the reception signal monitoring module 142 may determine in this case that it is not in the saturating state when the detection range is greater than the predetermined range or the water bottom is not detected.

The transmitting condition setting module 145 changes the condition of the transmission signal when the reception signal monitoring module 142 determines that the reception signal is in the saturating state. That is, the transmitting condition setting module 145 performs setting of the transmission circuit 13 to reduce the power of the transmission signal from the next ping, thereby preventing the saturation of the reception signal.

However, when the transmitting power is reduced, the intensity of the reception signal will also be reduced, and it will appear that the level of the echo data displayed on the display unit 18 falls only during the period where the transmitting power is reduced. For this reason, the level-correction calculation module 146 increases the level of the echo data according to the power reduction amount of the transmission signal set in the transmitting condition setting module 145. Thereby, it is prevented that the displayed levels of only some of the pings are reduced. However, this level-correction is not essential in the present invention.

Figure 4B:
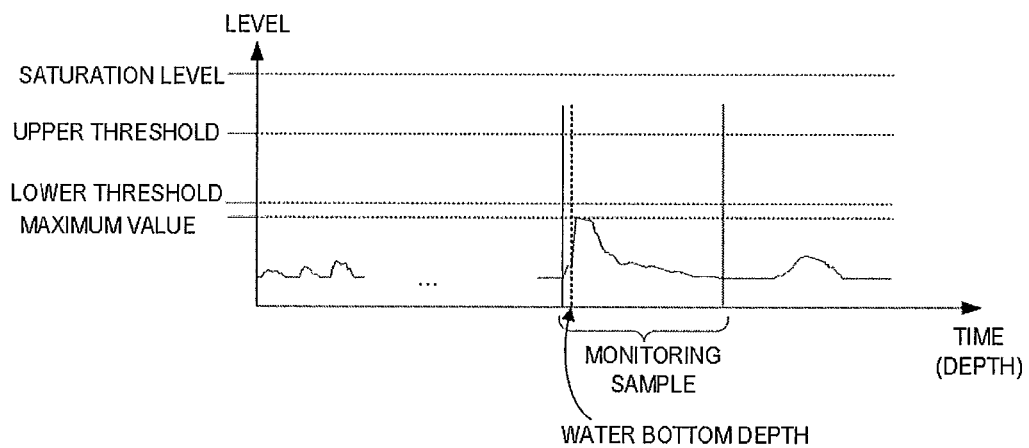

On the other hand, as shown in FIG. 4B, the reception signal monitoring module 142 reports to the transmitting condition setting module 145 that the maximum value of the reception signal is below a lower threshold, when the maximum value of the reception signal is below the lower threshold, that is, when the maximum value of the reception signal is lower than the saturation level by a predetermined difference. Alternatively, when performing the bottom sediment determination, the reception signal monitoring module 142 reports that the bottom sediment changed from a bottom sediment type with a higher reflection intensity such as rocks to a bottom sediment type with a lower reflection intensity such as sand or mud.

When the report of the maximum value of the reception signal being below the lower threshold is received, or when the report of the bottom sediment changed to the bottom sediment with a lower reflection intensity is received, the transmitting condition setting module 145 sets the transmission circuit 13 to increase the power of the transmission signal, stating from the next ping. For example, after the reception signal reaches the saturation condition and the transmitting power is reduced, when the water bottom depth changes or when the bottom sediment changes to significantly lower the intensity of the water bottom echo, the transmitting condition setting module 145 increases the transmitting power to improve the S/N ratio.

Note that, if the transmitting power is increased, the intensity of the reception signal will also increase. For this reason, the level of the echo data displayed on the display unit 18 appears to be increased only during the period where the transmitting power is increased. Then, the level-correction calculation module 146 reduces the level of the echo data according to the power increasing amount of the transmission signal set in the transmitting condition setting module 145. Thereby, the appeared level of only some of pings can be prevented from increasing. However, this correction is not essential in the present invention, either.

Note that, when the echo intensity increases rapidly in a short period of time and the reception signal reaches the saturation condition, the suitable pulse compression cannot be performed temporarily, and proper echo data may not be displayed. However, in this embodiment, since the transmitting power is reduced from the next ping and the period during which the echo data is not suitable is only 1 ping, there is very little influence on the detection.

Figure 3:
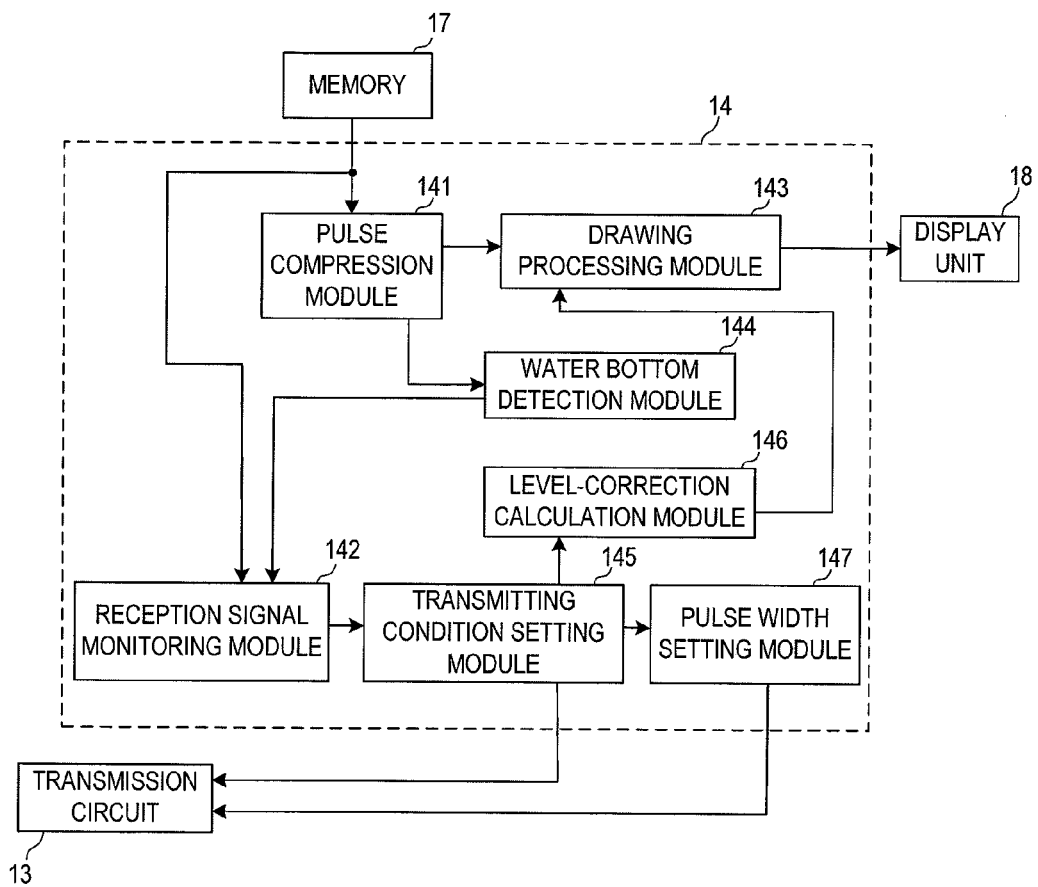
FIG. 3 is a block diagram showing a configuration of a controller according to another example.

Next, FIG. 3 shows another example of the controller 14. The controller 14 in this example includes a pulse width setting module 147, in addition to the configuration of the controller 14 shown in FIG. 2. Other configurations and functions are similar to those of the example shown in FIG. 2; therefore, detailed description thereof is omitted.

The pulse width setting module 147 sets a pulse width of the transmission signal according to the reducing amount and the increasing amount of the transmitting power in the transmitting condition setting module 145. That is, the pulse width setting module 147 suppresses the reduction of the S/N ratio by extending the pulse width according to the reducing amount of the transmitting power. Moreover, the pulse width setting module 147 shortens the pulse width according to the increasing amount of the transmitting power. If the pulse width is too long, an offset of the phase becomes large, and according to a ship's traveling speed or a moving speed of a school of fish, there is a possibility that a peak level of the reception signal after the compression may fall. Therefore, when the S/N ratio can be raised by increasing the transmitting power, it is desirable to set the pulse length shorter.

Thus, the controller 14 of the example shown in FIG. 3 can secure a fixed S/N ratio by changing the pulse width according to the transmitting power.

Figure 6:
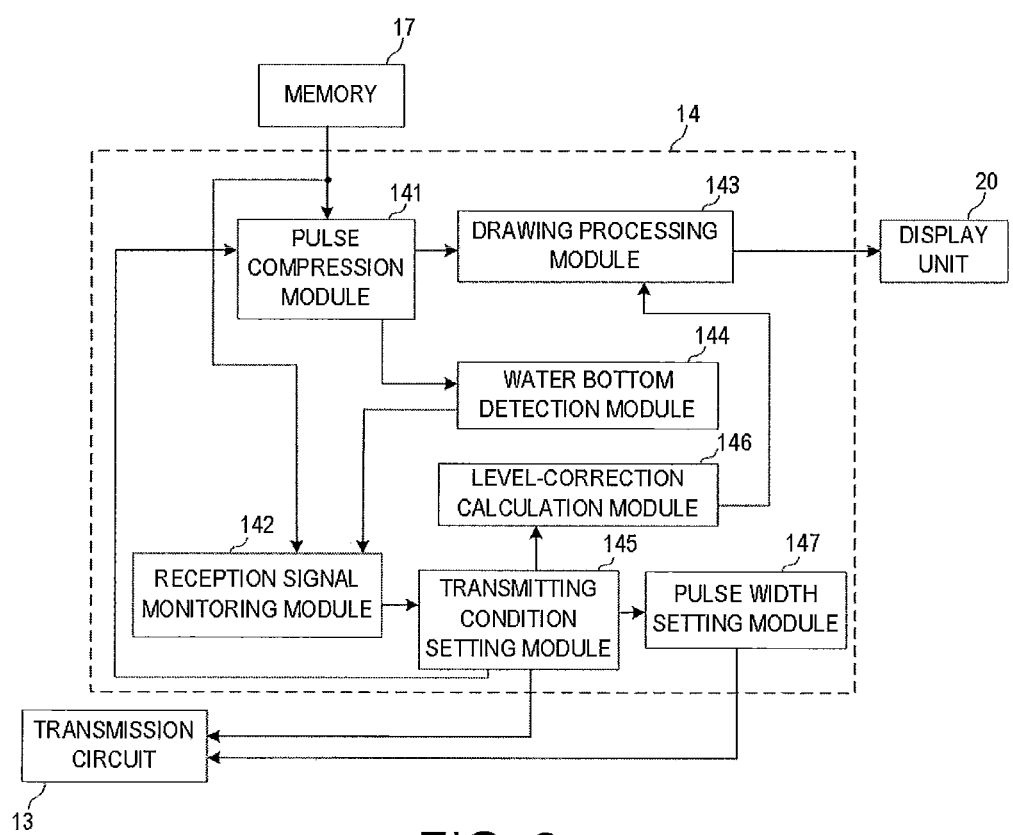
FIG. 6 is a block diagram showing a configuration of a controller according to and a still another example.

FIG. 6 shows still another example of the controller 14. Although the configuration of the controller 14 in this example shown in FIG. 6 is similar to that shown in FIG. 3, operations of the pulse compression processing module 141, the transmitting condition setting module 145, and the pulse width setting module 147 differ. In FIG. 6, the operations of the pulse compression processing module 141, the transmitting condition setting module 145, and the pulse width setting module 147 are described, and description of other configurations is omitted.

The transmitting condition setting module 145 shown in FIG. 6 outputs the determined transmitting condition to the pulse compression processing module 141. The pulse compression processing module 141 turns ON/OFF the pulse compression according to the reducing amount and the increasing amount of the transmitting power in the transmitting condition setting module 145. That is, when the transmitting power increases greater than a predetermined level, the pulse compression processing module 141 in the example of FIG. 6 stops the pulse compression, and then transmits the reception signal as it is to the drawing processing module 143. Furthermore, the pulse width setting module 147 sets the pulse width of the transmission signal according to the reducing amount and the increasing amount of the transmitting power in the transmitting condition setting module 145 similar to the example of FIG. 3. However, when the transmitting power increases greater than the predetermined level, since the pulse compression of the pulse compression processing module 141 is stopped, the pulse width is set very short. That is, the pulse width setting module 147 sets the pulse width of the transmission signal as the same pulse width as that of the reception signal after the pulse compression when the pulse compression processing module 141 performs the pulse compression. Thereby, the resolution will not change with ON/OFF of the pulse compression. Thus, since the S/N ratio becomes higher when the transmitting power becomes very large, the high S/N ratio can be secured without performing the pulse compression.

Figure 5:
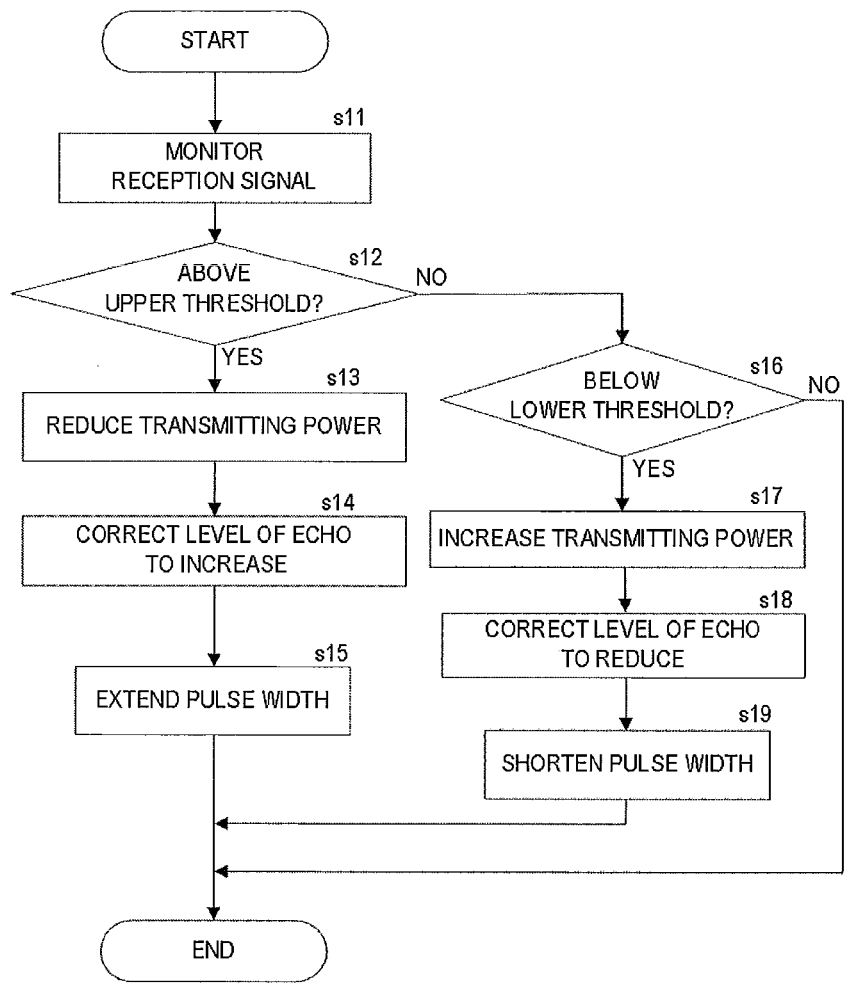
FIG. 5 is a flowchart showing an operation of the controller.

Next, the operation of the controller 14 is described with reference to the flowchart of FIG. 5. As shown in FIG. 5, the reception signal monitoring module 142 in the controller 14 first monitors the intensity of the reception signal based on the saturation condition (s11). That is, the reception signal monitoring module 142 reads the reception signal (signal before the pulse compression) according to the water bottom depth from the memory 17, calculates the intensity of the maximum value, and compares it with the upper threshold and the lower threshold, respectively.

Then, when the reception signal monitoring module 142 determines that the maximum value of the reception signal is above the upper threshold (s12), it determines to be in the saturating state. If the reception signal monitoring module 142 determines to be in the saturating state, the transmitting condition setting module 145 sets to reduce the power of the transmission signal (s13). The level-correction calculation module 146 corrects the level of the echo data so that the level increases according to the power reduction amount of the transmission signal (s14). Furthermore, if the controller 14 has the configuration shown in FIG. 3, the pulse width setting module 147 extends the pulse width according to the power reduction amount of the transmission signal (s15).

On the other hand, if the reception signal monitoring module 142 determines that the maximum value of the reception signal is below the lower threshold (s16), the transmitting condition setting module 145 sets to increase the power of the transmission signal (s17). The level-correction calculation module 146 corrects the level of the echo data so that the level reduces according to the power increasing amount of the transmission signal (s18). If the controller 14 has the configuration shown in FIG. 3, the pulse width setting module 147 shortens the pulse width according to the power reduction amount of the transmission signal (s19). Alternatively, in S19, if the controller 14 has the configuration shown in FIG. 6, when the predetermined condition is satisfied (as described above, when the power of the transmission signal becomes greater than the predetermined level, or when the S/N ratio calculated from the reception signal becomes above the predetermined value), the pulse compression is stopped, and the pulse width of the transmission signal is set so that it has the same pulse width as the pulse width of the reception signal in case the pulse compression is performed.

As described above, with the fish finder shown in this embodiment, when the reception signal reaches the saturation condition or becomes close to the saturation condition, since the setting to reduce the transmitting power is performed, the saturation of the reception signal can be prevented. Moreover, even when the power of the transmission signal is changed, since the display correction of the echo data is performed according to the set transmitting power, it can prevent that the appeared levels of only some of pings fall or rise. Furthermore, if performing the pulse compression of the reception signal, since the pulse width is set according to the set transmitting power, the S/N ratio greater than the certain value can be secured.

Note that, although this embodiment shows examples that performs the pulse compression and the drawing processing in the controller 14, dedicated hardware may be provided separately.

Moreover, in this embodiment, although the fish finder is described, the present invention is also applicable to other detection devices including a radar device.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is designed in at least that way, but may also be configured in ways that are not listed.

What is claimed is:

1. A detection device, comprising:
   a transceiver configured to output a reception signal according to an echo intensity of a transmission signal that was transmitted by the transceiver;
   a pulse compressor configured to perform pulse compression of the reception signal;
   a reception signal monitor configured to monitor an intensity of the reception signal before the pulse compression based on a saturation condition;
   a transmitting condition setter configured to control the transceiver to reduce a transmitting power of a next transmission signal to be transmitted by the transceiver by a power reduction amount lower than a transmitting power of the transmission signal according to the intensity of the reception signal before the pulse compression as monitored by the reception signal monitor to prevent saturation of a next reception signal to be received by the transceiver according to an echo intensity of the next transmission signal; and
   a transmission pulse width setter configured to extend a pulse width of the next transmission signal according to the power reduction amount by which the transmitting condition setter reduces the transmitting power of the next transmission signal.

2. The detection device of claim 1, further comprising:
   a display configured to display echo data based on the pulse compressed reception signal; and
   a drawing processor configured to perform a display correction of the echo data according to the transmitting power set by the transmitting condition setter.

3. The detection device of claim 2, further comprising a water bottom detector configured to detect a water bottom depth,
   wherein the reception signal monitor is further configured to monitor the intensity of the reception signal according to the water bottom depth.

4. The detection device of claim 2, wherein the transmitting condition setter is further configured to increase the transmitting power of the next transmission signal when the reception signal monitor detects an intensity lower than the saturation condition by a predetermined difference.

5. The detection device of claim 1, wherein
the pulse compressor is configured to stop the pulse compression when the transmitting power set by the transmitting condition setter satisfies a predetermined condition; and
wherein the transmission pulse width setter is configured to set the pulse width of the next transmission signal as the same pulse width as the pulse width of the reception signal after the pulse compression in case the pulse compressor performs the pulse compression, if the transmitting power of the next transmission signal set by the transmitting condition setter satisfies the predetermined condition.

6. The detection device of claim 5, further comprising a water bottom detector configured to detect a water bottom depth,
wherein the reception signal monitor is further configured to monitor the intensity of the reception signal according to the water bottom depth.

7. The detection device of claim 5, wherein the transmitting condition setter is further configured to increase the transmitting power of the next transmission signal when the reception signal monitor detects an intensity lower than the saturation condition by a predetermined difference.

8. The detection device of claim 1, further comprising a water bottom detector configured to detect a water bottom depth,
wherein the reception signal monitor is further configured to monitor the intensity of the reception signal according to the water bottom depth.

9. The detection device of claim 1, wherein the transmitting condition setter is further configured to increase the transmitting power of the next transmission signal when the reception signal monitor detects an intensity lower than the saturation condition by a predetermined difference.

10. A method, comprising:
outputting a reception signal according to an echo intensity of a transmission signal;
performing pulse compression of the reception signal;
monitoring an intensity of the reception signal before the pulse based on a saturation condition;
reducing a transmitting power of a next transmission signal by a power reduction amount lower than a transmitting power of the transmission signal according to the intensity of the monitored reception signal before the pulse compression to prevent saturation of a next reception signal to be received according to an echo intensity of the next transmission signal; and
extending a pulse width of the next transmission signal according to the power reduction amount by which the transmitting power of the next transmission signal is reduced.

11. A non-transitory computer readable medium having stored thereon a program which cause a processor to perform the operations of,
outputting a reception signal according to an echo intensity of a transmission signal;
performing pulse compression of the reception signal;
monitoring an intensity of the reception signal before the pulse based on a saturation condition;
reducing a transmitting power of a next transmission signal by a power reduction amount lower than a transmitting power of the transmission signal according to the intensity of the monitored reception signal before the pulse compression to prevent saturation of a next reception signal to be received according to an echo intensity of the next transmission signal; and
extending a pulse width of the next transmission signal according to the power reduction amount by which the transmitting power of the next transmission signal is reduced.

* * * * *